J. E. Ross,
Cotton Planter.
No. 110,290.  Patented Dec. 20, 1870.
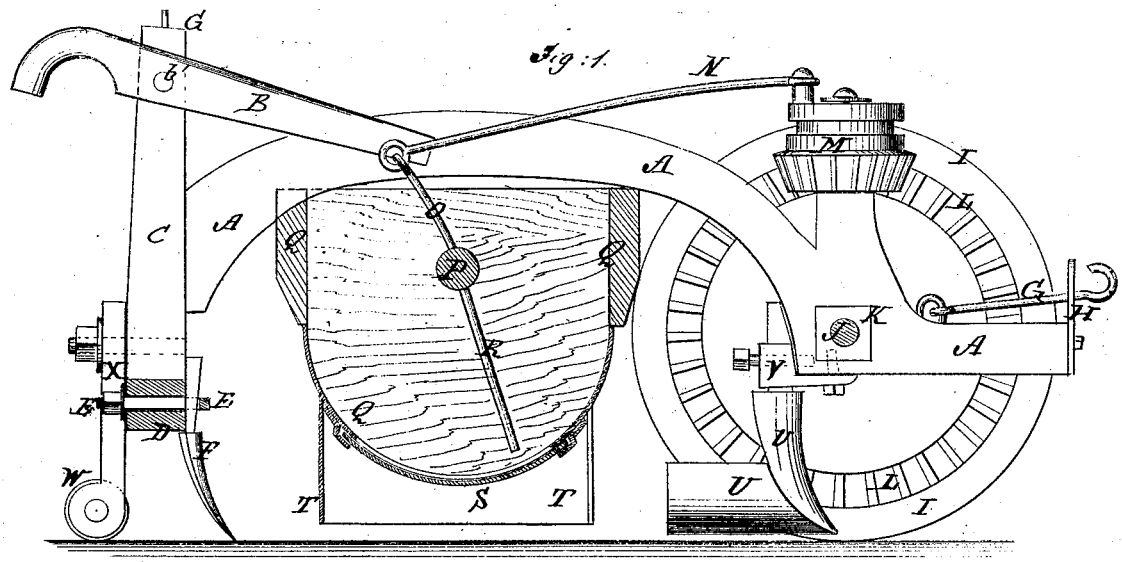
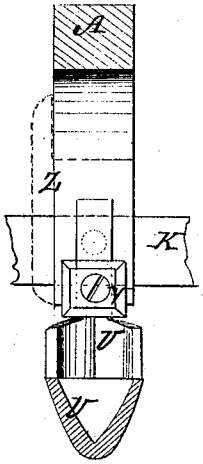

United States Patent Office.

JOHN E. ROSS, OF GREENESBOROUGH, GEORGIA.

Letters Patent No. 110,290, dated December 20, 1870.

IMPROVEMENT IN COMBINED COTTON-PLANTERS AND GUANO-DISTRIBUTERS.

The Schedule referred to in these Letters Patent and making part of the same.

*To all whom it may concern:*

Be it known that I, JOHN E. ROSS, of Greenesborough, in the county of Greene and State of Georgia, have invented a new and useful Improvement in Planter and Distributer; and I do hereby declare that the following is a full, clear, and exact description thereof, which will enable others skilled in the art to make and use the same, reference being had to the accompanying drawing forming part of this specification.

Figure 1 is a vertical longitudinal section of my improved machine arranged as a planter.

Figure 2 is a detail rear view, partly in section, of the furrowing-plow.

Similar letters of reference indicate corresponding parts.

My invention has for its object to furnish an improved machine which may be easily adjusted for use as a planter and distributer, and which will be reliable in use and effective in operation in either capacity; and It consists in the construction and combination of the various parts of the machine, as hereinafter more fully described.

A is the beam, which is made of iron, and is curved or arched, as shown in fig. 1.

B are the handles, the forward ends of which are secured to the beam A, and the rear parts of which are connected and supported by a round, b', which passes through the upper end of the standard C, which is attached to the rear end of the beam A.

To the lower end of the standard C is attached the cross-bar D, the end parts of which are slotted horizontally, to receive the eye or stirrup-bolts E, by which the plows F are adjustably secured in place.

Two of the plows F may be ordinary bull-tongue or shovel-plows, and the other two may be half-shovel plows.

The plows F are arranged as the particular work to be done may require.

To the forward part of the upper side of the beam A is pivoted the draw-bar G, which passes through a hole in the upper end of the guide H, which is secured to the forward end of the said beam A by a bolt passing through a slot in said guide, so that the point of draft-attachment may be raised and lowered, at will.

I are the drive-wheels, which are placed upon, and one or both rigidly secured to the axle J, which passes through and revolves in the long bearing K, which passes through and is secured to the forward part of the beam A.

To the axle J, or to one of the wheels I, is securely attached the bevel-gear wheel L, the teeth of which mesh into the teeth of the small bevel-gear wheel M, which revolves upon a spindle attached to the beam A directly above the axle J.

To the upper side of the gear-wheel M is attached a crank-pin, to which is pivoted the forward end of the connecting-rod N, the rear end of which is pivoted to the upper end of the rod or arm O, the lower end of which is rigidly attached to the shaft P, the ends of which are pivoted to the sides of the hopper Q.

To the shaft P are attached three, more or less, fingers, R, which project downward to or nearly to the bottom of the said hopper, and, by their movements, keep the cotton-seed or guano stirred up, so that it may pass out freely.

The hopper Q is swung beneath, and is securely but detachably attached to the under side of the beam A.

The body of the hopper Q may be made of wood, but its bottom, which should be made semi-cylindrical in form, should be made of sheet metal.

In the center of the bottom of the hopper Q is formed a slot, through which the seed or guano escapes to the ground.

S are slides, fitted to the bottom of the hopper Q, one upon each side of the slot in said bottom, so that, by simply adjusting the position of the slides S, the size of the discharge-opening may be regulated at will.

T is a long and narrow guide-spout, attached to the bottom of the hopper, to guide the seed or guano in its descent to the ground, and insure its entering the furrow.

U is the furrowing-plow, the shank of which passes up through a hole in the support V, where it is adjustably secured in place by a set-screw.

The support V is detachably secured to the lower side of the forward part of the beam A, as shown in fig. 1.

The forward part of the plow U may be made similar to an ordinary shovel-plow, and to its rear side is attached, or upon it is formed, a V-shaped extension or smoother, to smooth and compress the sides of the furrows, to insure the seeds or guano passing to the bottom of the furrow, and to prevent the sides of the furrow from falling in before the seed or guano has reached its place.

W is a roller, which is pivoted to the lower end of the standard X, which is slotted, and adjustably secured to the standard C by a bolt, so that the said roller may be raised and lowered, as desired.

Having thus described my invention,

I claim as new and desire to secure by Letters Patent—

1. In planters and guano-distributers, the beam A, arched over the center, to receive thereunder the seed-hopper, and having a vertical projection, to support the horizontal pinion M, as shown and described.

2. The horizontal pinion M, having a crank-pin attached thereto, and arranged upon a vertical stud of the beam, combined, as described, with a stirring device, N O P R, for the purpose specified.

3. The bottom-slotted and curved hopper Q S S, combined with vibrating fingers R, (to separate the seed, and keep up a steady discharge current,) and the narrow guide-spout T, to converge the seed to the center of furrow, as described.

JOHN E. ROSS.

Witnesses:
  T. TUNISON,
  R. M. PATTILLO.